United States Patent
Kopans

(10) Patent No.: US 10,771,415 B2
(45) Date of Patent: *Sep. 8, 2020

(54) COMPUTER SYSTEM AND METHOD FOR ADDING ATTRIBUTES TO AN ELECTRONIC MESSAGE ON BEHALF OF THE MESSAGES SENDER

(71) Applicant: PF Loop Inc., Arlington, MA (US)

(72) Inventor: David Kopans, Arlington, MA (US)

(73) Assignee: PF Loop, Inc., Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,583

(22) Filed: Jul. 19, 2019

(65) Prior Publication Data

US 2019/0342238 A1 Nov. 7, 2019

Related U.S. Application Data

(63) Continuation of application No. 15/190,726, filed on Jun. 23, 2016, now Pat. No. 10,361,979.

(60) Provisional application No. 62/185,161, filed on Jun. 26, 2015.

(51) Int. Cl.
*G06F 15/16* (2006.01)
*H04L 12/58* (2006.01)

(52) U.S. Cl.
CPC ......... *H04L 51/063* (2013.01); *H04L 51/066* (2013.01); *H04L 51/24* (2013.01)

(58) Field of Classification Search
None
See application file for complete search history.

(56) References Cited

U.S. PATENT DOCUMENTS

| 10,361,979 B2 | 7/2019 | Kopans | |
| 2008/0046518 A1* | 2/2008 | Tonnison | G06Q 10/107 709/206 |
| 2008/0306851 A1* | 12/2008 | Weyerman | G06Q 40/02 705/35 |

* cited by examiner

*Primary Examiner* — Phuoc H Nguyen
(74) *Attorney, Agent, or Firm* — Blueshift IP, LLC; Robert Plotkin

(57) ABSTRACT

A message creator encodes message information into an original message. The message creator transmits the original message to a message recipient via a first medium. The message recipient receives the original message and decodes the original message to extract the encoded message information. The message recipient adds and/or modifies an attribute of the original message and re-encodes the message information in a modified message. The computer system transmits the modified message as if it were transmitted from the message creator to the message recipient. One attribute that the message recipient may modify is the message medium. As a result, the modified message may be transmitted via a different medium than the original message.

19 Claims, 6 Drawing Sheets

COMPUTER SYSTEM AND METHOD FOR ADDING ATTRIBUTES TO AN ELECTRONIC MESSAGE ON BEHALF OF THE MESSAGES SENDER

CROSS-REFERENCE TO RELATED APPLICATIONS

This application is related to U.S. patent application Ser. No. 14/454,915, filed on Aug. 8, 2014, entitled, "Computer System and Method for Generating, Exchanging, and Valuing Social Currency," now U.S. Pat. No. 9,463,383 B2, which is hereby incorporated by reference herein.

BACKGROUND

Many systems exist for enabling people to send messages to each other. For example, email systems enable a message sender to write an email message and then to send the email message over an electronic communication network, such as the Internet, to a message recipient. Although the message recipient may then send an additional message to the message sender (such as a reply to the original message), in connection with each message the roles and capabilities of message sender and message recipient are fixed.

SUMMARY

In a computer system, a message creator (e.g., a first computing device) encodes message information into an original message. The message creator transmits the original message to a message recipient (e.g., a second computing device) via a first medium. The message recipient receives the original message and decodes the original message to extract the encoded message information. The message recipient adds and/or modifies an attribute of the original message and re-encodes the message information in a modified message. The computer system transmits the modified message as if it were transmitted from the message creator to the message recipient. One attribute that the message recipient may modify is the message medium. As a result, the modified message may be transmitted via a different medium than the original message.

Other features and advantages of various aspects and embodiments of the present invention will become apparent from the following description and from the claims.

DETAILED DESCRIPTION

Figure 1A:
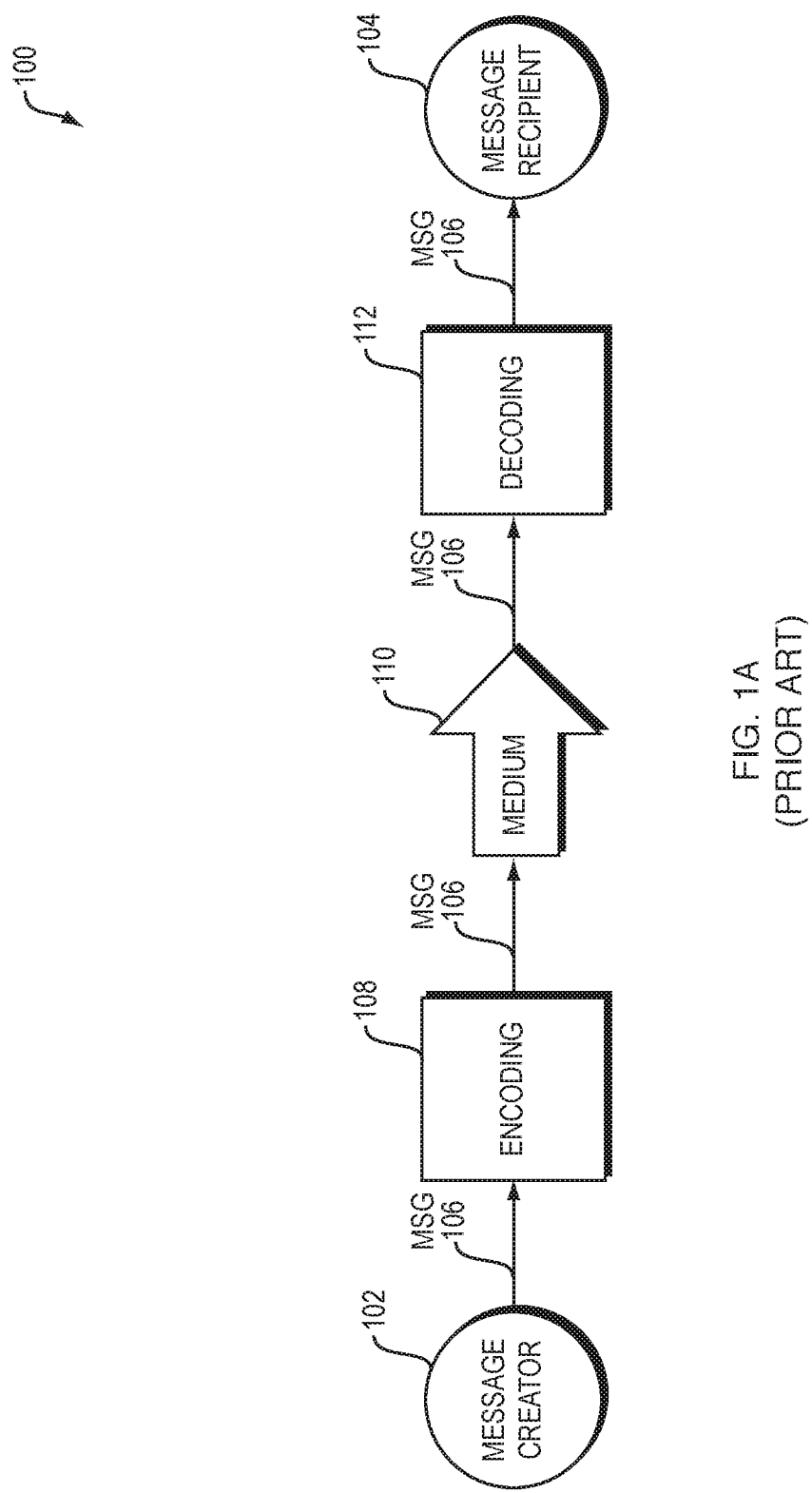
FIGS. 1A-1B are diagrams of message encoding, transmission, and decoding according to the prior art.

Since the early days of communication, humanity has been captivated by the methods it uses to convey and preserve information. How we communicate with each other defines who we are and constitutes so much of what makes a culture and an individual unique.

When it comes to understanding the power of how we communicate, one of the best to learn from is Marshall McLuhan. His famous quote "The medium is the message" eloquently puts forth a deep communication theory, which is that the medium through which we choose to communicate holds as much, if not more, value than the message itself.

Indeed, the medium through which a message is experienced shapes the user's perception of the message by embedding itself in the message, creating a symbiotic relationship by which the medium influences how the message is perceived and each medium, independent of the content it mediates, has its own intrinsic effects which are in fact the medium's unique message.

Whereas until now the medium through which a message is experienced has been chosen solely and permanently by the Creator of the message (referred to herein as the "Message creator"), embodiments of the invention disclosed herein change that paradigm. Now, for the first time, when a message creator creates and sends a message (referred to herein as an "original message") to a recipient (referred to herein as the "message recipient"), embodiments of the present invention enable the message recipient to add and/or modify one or more attributes of the original message (e.g., to change the medium chosen by the message creator and via which the original message was originally sent from the message creator to the message recipient), thereby creating a modified message, to do this on behalf of the message creator, and to alert the message creator to this fact. Embodiments of the present invention allow the message recipient to effectively "resend the message" on behalf of the message creator to the message recipient with the attributes that were added and/or modified by the message recipient (such as by sending the message via the medium chosen by the message recipient). In certain embodiments of the present invention, the modified message may explicitly be sent to the message recipient with the attributes added and/or modified by the message recipient (e.g., via the medium chosen by the message recipient), either actually from the message creator or as if the message had been resent by the message creator to the message recipient with the attributes added and/or modified by the message recipient (e.g., via the medium chosen by the message recipient).

This ability for the message recipient to—ex post facto—add and/or modify attributes of the original message on behalf of the message creator (such as by choosing another medium via which to transmit the original message), to effectively "resend" the original message on behalf of the message creator with the added and/or modified attributes, and thus in the process, to affix additional meaning and attributes to a message previously received, where the additional meaning and attributes are shared with the message creator, is novel and non-obvious.

As the above description makes clear, a medium is merely one example of a message "attribute," as that term is used herein. Other examples of message attributes include, for example, the identity of the message creator (e.g., in the form of a username, email address, or other unique identifier), the identity of the message recipient (e.g., in the form of a username, email address, or other unique identifier), the time at which the original and/or modified message was sent, and the place at which the original and/or modified message was created. Other examples of message attributes are disclosed herein.

Furthermore, certain embodiments of the present invention enable the message recipient to create electronic messages representing physical objects on behalf of the message creator and to insert those electronic representations of physical objects into a new medium on behalf of the message creator. For example, if the message creator sends a physical object to the message recipient, the message recipient may create an electronic message which includes an electronic representation of the physical object received by the message recipient from the message creator, and to send (actually or effectively) the electronic message from the message creator to the message recipient. This feature of certain embodiments of the present invention is likewise novel and non-obvious.

Furthermore, because embodiments of the present invention enable the message recipient to create, on behalf of the message creator, an electronic copy of messages that the message creator can access in the new medium, this feature of certain embodiments of the present invention is likewise novel and non-obvious.

Furthermore, embodiments of the present invention are unique in that they provide the message creator with the ability to either accept or reject actions performed by the message recipient after the message recipient received the message. Such is not a feature that is available in the current state of the art.

As will be described in more detail below, the term "message creator" may refer to a human, a computer system (e.g., a desktop computer, laptop computer, tablet computer, or smartphone), software executing on a computer system, a messaging account (e.g., an email account, social networking account, or messaging app account), or any combination thereof. Similarly, the "message recipient" may refer to a human, a computer system (e.g., a desktop computer, laptop computer, tablet computer, or smartphone), software executing on a computer system, a messaging account (e.g., an email account, social networking account, or messaging app account), or any combination thereof. As some particular examples, the message creator and message recipient may be:

a first and second computer system, respectively, in communication with each other over a telecommunications network, such as the Internet;

a messaging account and a computer system, respectively;

a computer system and a messaging account, respectively; or a first messaging account and a second messaging account, respectively.

The term "message creator device" is used herein to refer specifically to a computer system that is a "message creator," as that term is used herein. In other words, if it is desired to specify that a particular message creator is a computer system, then the term "message creator device" is used herein to refer to that message creator. Similarly, the term "message recipient device" is used herein to refer specifically to a computer system that is a "message recipient," as that term is used herein. In other words, if it is desired to specify that a particular message creator is a computer system, then the term "message recipient device" is used herein to refer to that message recipient.

In any of the examples disclosed herein, the original message and/or modified message may, for example, be digital electronic messages. The original message and/or modified message may be stored in a non-transitory computer-readable medium.

As described herein, the message creator may send the original message to the message recipient via an original medium. One example of such an original medium is one or more digital electronic networks, which may be wired and/or wireless, such as the Internet. Similarly, as described herein, the message recipient may effectively send the modified message from the message creator to the message recipient via a subsequent medium. One example of such a subsequent medium is one or more digital electronic networks, which may be wired and/or wireless, such as the Internet. The original medium may be the same as or differ from the subsequent medium.

Having provided a general overview of certain features of embodiments of the present invention, a more detailed explanation of certain features of the state of the art and of embodiments of the present invention will now be provided.

FIG. 1A shows a prior art system 100 in which a message 106 is transmitted from a message creator 102 to a message recipient 104. FIG. 1A is an abstract depiction of the system 100, in which the message 106 is abstract information intended to be transmitted by the message creator 102 to the message recipient 104. In this system 100, the message creator 102 uses an encoding process 108 to encode the message 106. The system 100 then transmits the message 106 via a medium 110. The system 100 then uses a decoding process 112 to decode the message 106. Then system 100 then enables the message recipient 104 to receive the message 106 from the message creator 102.

The system 100 may include humans, machines, or a combination thereof. For example, the message creator 102 and/or message recipient 104 may be humans or machines, in any combination. As a particular example, both the message creator 102 and the message recipient 104 may be humans. As another example, the medium 110 may be or include humans and/or machines in any combination.

Figure 1B:
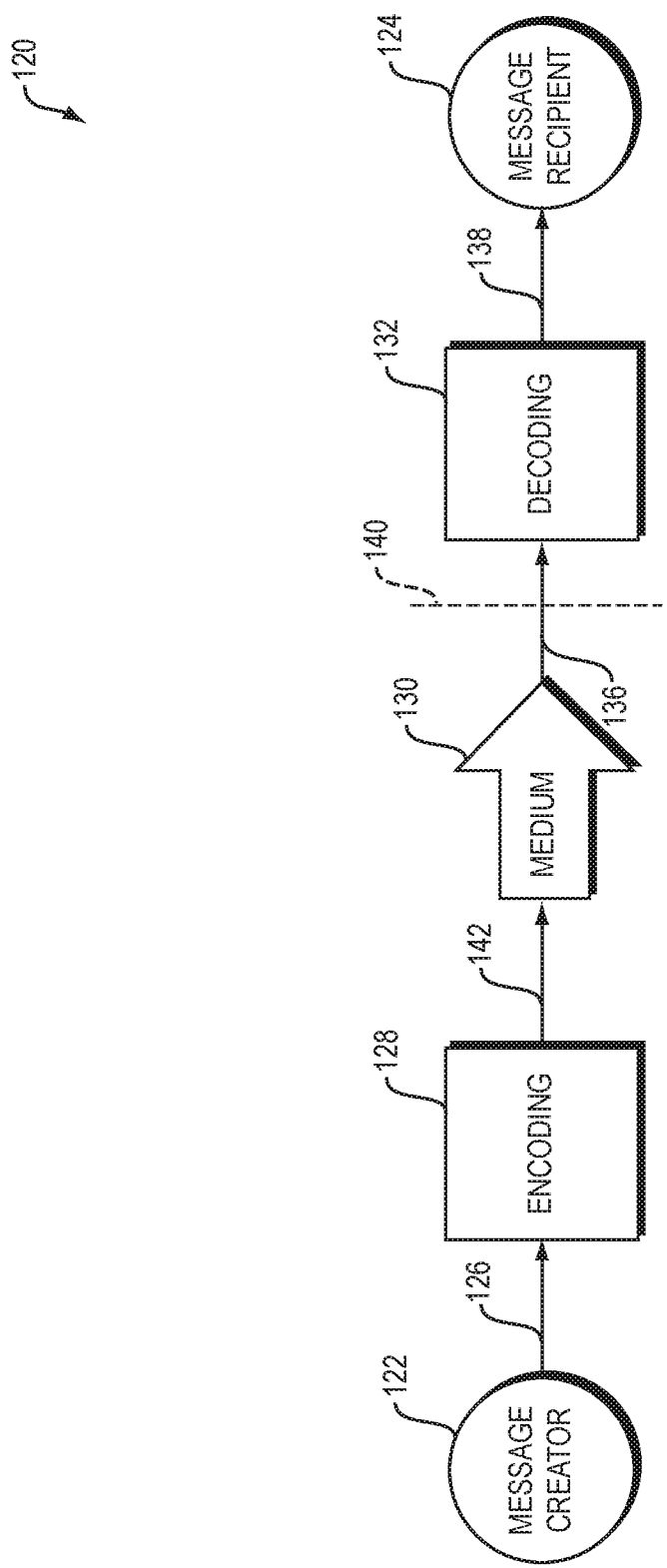

FIG. 1B shows a prior art system 120 in which a message is created by a message creator 122, and in which the message is transmitted by the message creator 122 to a message recipient 124. Of critical importance is the dashed line 140 that demarks responsibilities and control over the messaging process. In the current state of the art the message creator 122 is solely in control of the choice of the encoding process 128 and medium 130. Further, it is important to note that, in keeping with McLuhan's perspective that "the medium is the message," the choice of medium 130 also contains encoded message information even though they are represented by separate icons.

In FIG. 1B, the message creator 122 is the individual, group, or computer system that uses the system 120 to convey message information. (The pronoun "it" will be used herein to refer to individual message creators and message recipients herein, even though in individual cases "he," "she," or "they" may be more accurate). The message creator 122 first determines why it is communicating and what it wants to communicate (i.e., the message information). The message creator 122 may do this directly or may outsource this activity to another.

In FIG. 1B, the message recipient 124 is the individual, group, and/or computer system to whom the message creator 122 directs the message information.

The message creator 122 uses an encoding process 128 to encode message information 126 into encoded message information 142. As merely one example, the encoding process 128 may be a computer system and/or software executing on a computer system, which may receive the message information 126 as input from the message creator 122. The encoding process 128 may encode the message information represented by such input into an encoded message, which may be stored in a non-transitory computer-readable medium, and which is an example of the encoded message information 142.

Although element 126 is referred to herein as "message information," the message information 126 may take the form of a message, such as a digital message, which may be transmitted via a (wired and/or wireless) network and/or stored in a non-transitory computer-readable medium. As one example, if the message creator 122 is a human, then the message information 126 may be input signals provided to a computer system by the message creator 122 using one or more input devices, such as a keyboard, mouse, trackpad, touchscreen, and/or microphone, in which case the encoding process 128 may encode the input signals into the encoded message information 142. As another example, if the message creator 122 is a computer system, then message information 126 may be a message that the message creator 122 provides (e.g., transmits via a (wired and/or wireless) network) to the encoding process 128. The message creator 122 and the encoding process 128 may be implemented in a single computer system (e.g., a single computing device). The encoded message information 142 may take the form of a message, such as a digital message, which may be transmitted via a (wired and/or wireless) network and/or stored in a non-transitory computer-readable medium.

In FIG. 1B, the encoding process 128 is performed by, or on behalf of (e.g., by a computer system), the message creator 122, and encodes the message information 126 into a sign and symbol system that can be sent to and decoded by the message recipient 124's decoding process 132.

FIG. 1B also shows a medium 130. Messages are conveyed through channels, such as face-to-face meetings, telephone calls, videoconferencing sessions, letters, email messages, memos, reports, and telecommunication networks (such as the Internet). Each such channel is an example of a "medium" as that term is used herein. Non-verbal media may be used to convey messages. For example, one person may send a gift, in the form of a physical object (e.g., flowers), to another person. This is an example of conveying a message via a non-verbal medium (namely, the physical object). In keeping with McLuhan's perspective that the medium is the message, the medium 130 via which a message is conveyed may itself contain encoded message information.

The medium 130 (and any other medium disclosed herein) may, for example, be, contain, or be contained within any of the seven layers of the 7-Layer Basic Reference Model (BRM) for Open Systems Interconnection (OSI). For example, the medium 130 (and any other medium disclosed herein) may be a physical layer medium (such as an electrical or mechanical medium, or any combination thereof), a data-link layer medium (such as one or more data frames (e.g., packets) transmitted over a physical link between network entities), a network layer medium (such as one or more paths for data between a pair of computers), a transport layer medium (such as a medium for transferring data between end systems), a session layer medium (such as a layer for managing sessions in which one application process requests access to another application process), a presentation layer medium (such as a medium for representing syntax of data), or an application layer medium (such as a medium that acts as an interface between a user and a host computer). These are merely examples and do not constitute limitations of the present invention.

In the system 120 of FIG. 1B, the encoded message information 142 is embodied in the medium 130. The system 200 may provide the encoded message information 142 to the message recipient 124 via the medium 130. As one example, the system 200 may transmit, transport, or otherwise provide the medium 130 to the message recipient 124. In the case of an electronic medium, such as a wire or a physical communication network, the message recipient 124 may already be in possession of or otherwise in proximity to the medium 130 before the message creator 122 encodes the message information 126, in which case the system 120 may not transport or otherwise provide the medium 130 to the message recipient 124. Instead, the system 200 may provide the encoded message information 142 to the message recipient 124 via the medium 130 by transmitting the original message 136 to the message recipient 124 over the communication network (e.g., the Internet).

FIG. 1B also shows a decoding process 132. The decoding process 132 extracts the encoded message information 142 from the medium 130 to produce original decoded message information 138. The decoding process 132 may provide (e.g., push) the original decoded message information 38 to the message recipient 124. Alternatively, the message recipient 124 may retrieve (e.g., pull) the original decoded message information 138 from the decoding process 132. As yet another alternative, the message recipient 124 may perform the decoding process 132. For example, the message recipient 124 may be a human who receives roses and interprets the roses as conveying a message of love from the message creator 122.

As merely one example, the decoding process 132 may be a computer system and/or software executing on a computer system, which may receive original message 136 or otherwise access the medium 130. The decoding process 132 may extract the encoded message information 142 from the medium, and thereby produce the decoded message information 138, which may take the form of a decoded message, which may be stored in a non-transitory computer-readable medium.

Figure 2:
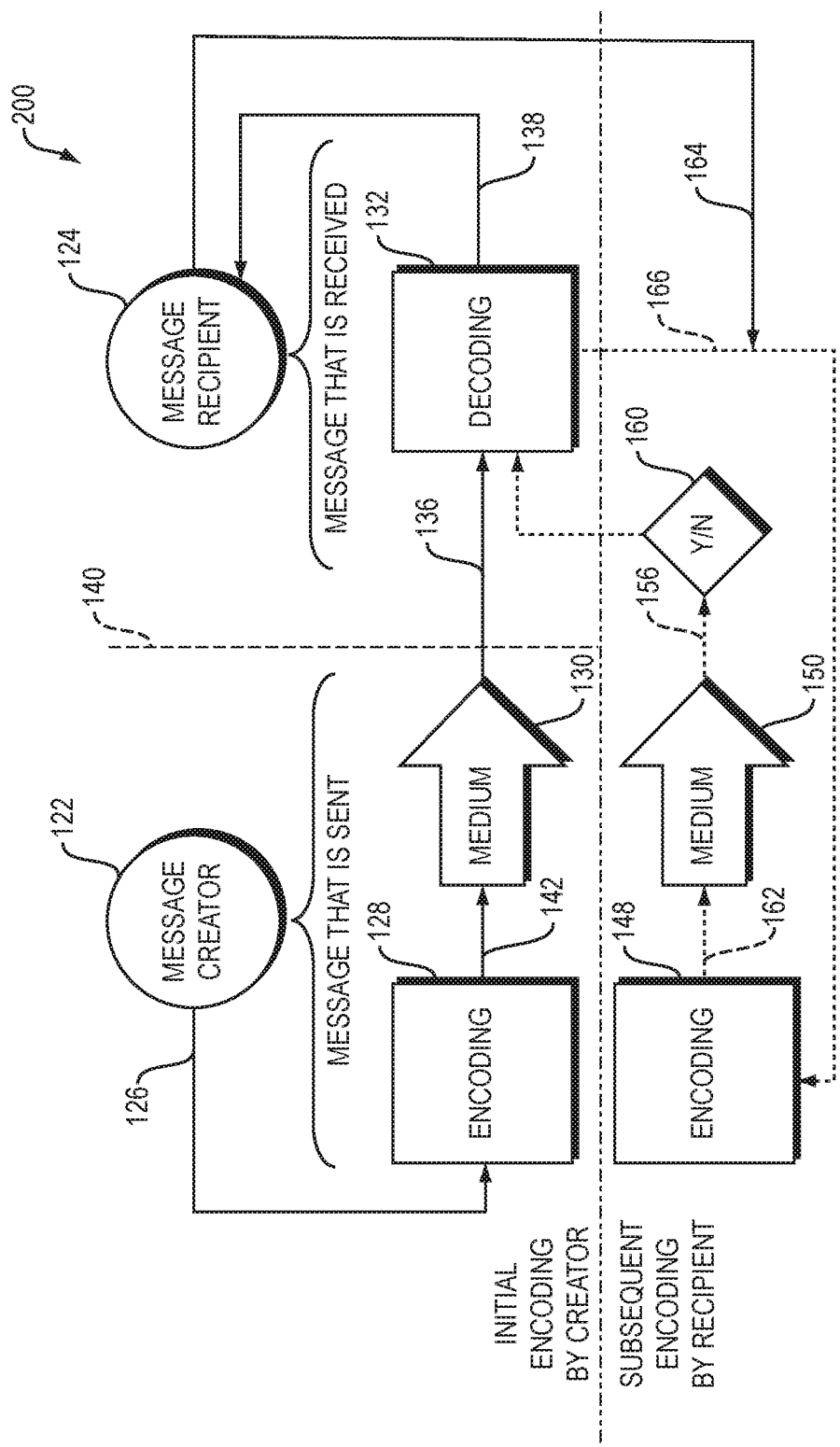
FIG. 2 is a diagram of message encoding, transmission, decoding, re-encoding, and re-transmission according to one embodiment of the present invention.
Figure 3:
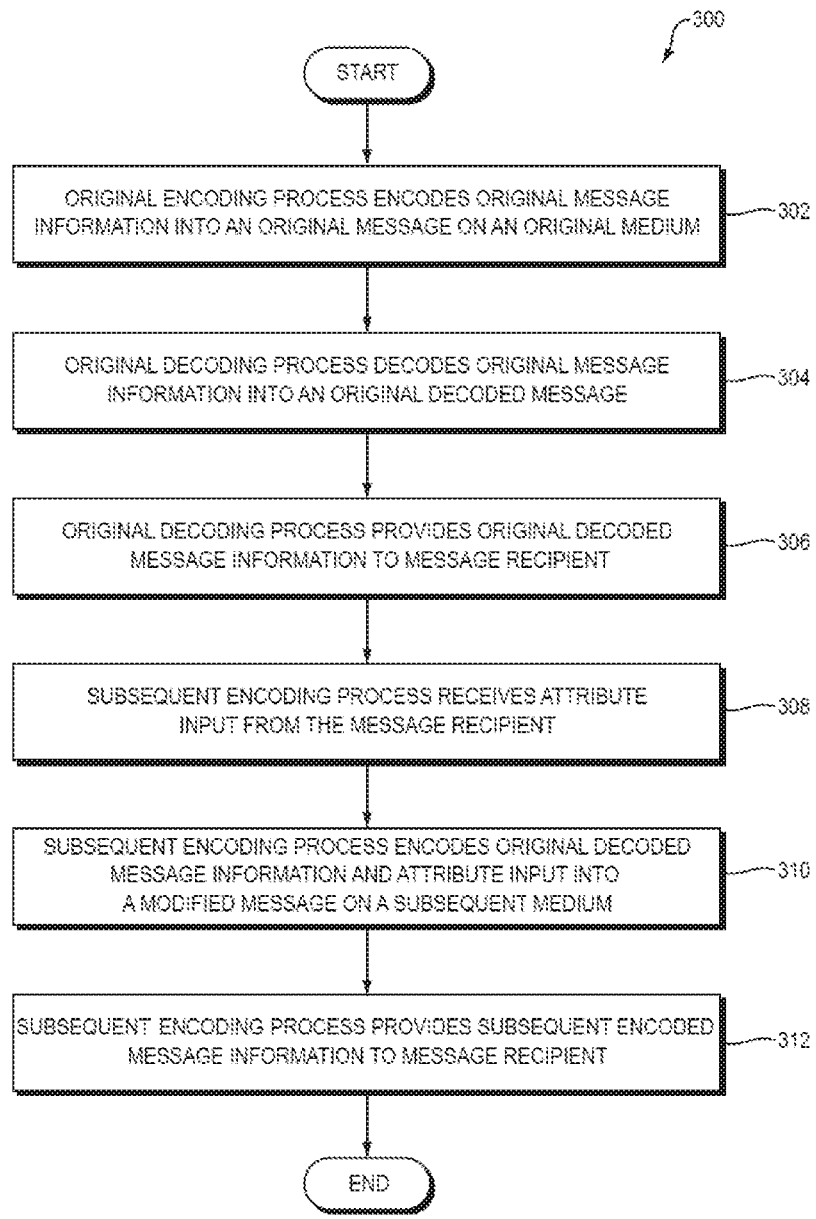
FIG. 3 is a flowchart of a method performed by the system of FIG. 2 according to one embodiment of the present invention.

FIG. 2 is a diagram illustrating a system 200 implemented according to one embodiment of the present invention. Referring to FIG. 3, a flowchart is shown of a method 300 performed by the system 200 of FIG. 2 according to one embodiment of the present invention.

The system 200 includes a message creator 122, which may be any of the kinds of message creators disclosed herein (e.g., a human, a computer system, or any combination thereof). In general, the message creator 122 uses the system 200 to transmit an original message 136 to a message recipient 124 via an original medium 130 according to one embodiment of the present invention. In contrast to the current state of the art, the system 200 of FIG. 2 includes a subsequent encoding process 148 and a subsequent medium 150, which are controlled by the message recipient 124. As will be described in more detail below, the subsequent medium 150 may, for example, more generally be any addition of or change to one or more attributes of the original message 136 originally transmitted by the message creator 122. The subsequent medium 150 is merely one example of such an attribute.

More specifically, as illustrated in FIG. 2, the system 200 includes an original encoding process 128, which may encode original message information 126 into an original message 136 embodied in an original medium 150 (FIG. 3, operation 302). The original encoding process 128 in FIG. 2 may, for example, encode the original message information 126 into the original message 136 in the same manner as in the current state of the art (e.g., as shown in FIGS. 1A and/or 1B). The message creator 122 may initiate the original encoding process 128, such as by providing input to a computer system, which instructs the computer system to perform the original encoding process 128. Alternatively, for example, the original encoding process 128 may execute in response to a trigger other than input from the message creator 122.

More specifically, the original encoding process 128 may encode the original message information into original encoded message information 142, which the encoding process 128 and/or other component of the system 200 may store in the original medium 130. The result of storing the original encoded message information 142 in the original medium 130 is the original message 136.

The system 200 also includes a decoding process 132, which may decode the resulting original message 136 into original decoded message information 138 (FIG. 3 operation 304). The decoding process 132 may be initiated, for example, in response to input from the message recipient 124 or automatically (e.g., not in response to input from the message recipient 124). The decoding process 132 and/or other component(s) of the system 200 may provide the resulting decoded message information 138 to the message recipient 124 (FIG. 3, operation 306).

Note that the operations 302, 304, and 306 are merely one example of how the original message information 126 may be provided to the message recipient 124. As another example, the message recipient 124 may receive the original message 136, after which the decoding process 132 may decode the original message 136 into the original decoded message information 138, which the decoding process 132 and/or other component of the system 200 may provide the message recipient 124. The decoding process 132 may be initiated, for example, in response to input from the message recipient 124 or automatically (e.g., not in response to input from the message recipient 124).

The system 200 also includes a subsequent encoding process 148, which may encode both the original decoded message information 138 and additional information 164 into a modified message 156 embodied in a subsequent medium 150. The subsequent encoding process 148 in FIG. 2 may, for example, encode the original decoded message information 138 and the additional information 164 into the modified message 156 in the same manner as the original encoding process 128. The original encoding process 128 and the subsequent encoding process 148 may, for example, be implemented as a single component, e.g., a single set of computer program instructions. The message recipient 124 may initiate the subsequent encoding process 148, such as by providing input to a computer system which instructs the computer system to perform the encoding process 128. Alternatively, for example, the subsequent encoding process 148 may execute in response to a trigger other than input from the message recipient 124.

More specifically, the subsequent encoding process 148 may encode the original decoded message information 138 and the additional information 164 into subsequent encoded message information 162, which the subsequent encoding process 148 and/or other component of the system 200 may store in the subsequent medium 150. The result of storing the subsequent encoded message information 162 in the subsequent medium 150 is the modified message 156. The subsequent encoding process 148 and/or other component(s) of the system 200 may provide the resulting subsequent encoded message information 162 to the message recipient 124 (FIG. 3, operation 312), such as by transmitting the modified message 156, or a notification thereof, to the message recipient 124.

As merely one example, the subsequent encoding process 148 may be a computing device and/or software executing on a computing device, which may, for example, receive the decoded message information 138 and the additional information 164 as input from the message recipient 124 (FIG. 3, operation 308). In FIG. 2, the combination of the original decoded message information 138 and the additional information 164 is shown as combined information 166. The subsequent encoding process 148 may encode the original decoded message information 138 and the additional information 164 represented by such input into the modified message 156, which may be stored in the subsequent medium 150, which may be a non-transitory computer-readable medium (FIG. 3, operation 310). The process of encoding 148 the subsequent encoded message information 162 into the subsequent medium 150 is an example of adding an attribute to the original message 136.

Although element 166 is referred to herein as "combined information," the combined information 166 may take the form of a message, such as a digital message, which may be transmitted via a (wired and/or wireless) network and/or stored in a non-transitory computer-readable medium. As one example, if the message recipient 124 is a human, then the combined information 166 may be input signals provided to a computer system by the message recipient 124 using one or more input devices, such as a keyboard, mouse, trackpad, touchscreen, and/or microphone, in which case the subsequent encoding process 148 may encode the input signals into the subsequent encoded message information 162. As another example, if the message recipient 124 is a computer system, then combined information 166 may be a message that the message recipient 124 provides (e.g., transmits via a (wired and/or wireless) network) to the subsequent encoding process 148. The message recipient 124 and the subsequent encoding process 148 may be implemented in a single computer system (e.g., a single computing device). The subsequent encoded message information 162 may take the form of a message, such as a digital message, which may be transmitted via a (wired and/or wireless) network and/or stored in a non-transitory computer-readable medium.

More specifically, the subsequent encoding process 148 may encode the combined information 166 into subsequent encoded message information 162, which the subsequent encoding process 148 and/or other component of the system 200 may store in the subsequent medium 150. The result of storing the subsequent encoded message information 162 in the subsequent medium 150 is the modified message 156.

The additional information may, for example, represent one or more values of one or more attributes. As a result, the additional information 164 is also referred to herein as attribute input 164. Information about such attributes may be lacking in the original decoded message information 138, but is contained within the combined information 166, which is encoded by the subsequent encoding process 148 into the subsequent encoded message information 162. As another example, the original decoded message information 138 may contain information about an attribute, such as information representing a value of an attribute, and the message recipient 124 may include, in the additional information 164, information representing a different value of the attribute (either instead of or in addition to the attribute value represented in the decoded message information 138). As a result, the subsequent encoding process 148 may encode some or all of the original decoded message information 138 in addition to the information representing the new attribute value. For example, the combined information 166 may include some or all of the original decoded message information 138, except that the original attribute value from the decoded message information 138 may be replaced with the new attribute value from the additional information 164 in the combined information 166, which may then be encoded by the subsequent encoding process 148 into the encoded message information 162.

The subsequent encoding process 148 that is used by or on behalf of the message recipient 124 may be the same as or differ from the original encoding process 128 that is used by or on behalf of the message creator 122 to encode the original message information 126.

As described above, the system 200 may embody the subsequent encoded message information 162 in the medium 150. The medium 150 may, for example, be transmitted, transported, or otherwise provided to the message recipient 124 in order to provide the subsequent encoded message information 162 to the message recipient 124. If the medium 150 is an electronic medium, such as a wire or a physical communication network, the message recipient 124 may already be in possession of or otherwise in proximity to the medium 150 before the subsequent encoding process 148 encodes the combined information 166, in which case the system 200 may not transport or otherwise provide the medium 150 to the message recipient 124. Instead, the system 200 may transmit the modified message 156 to the message recipient 124 via the medium 150. The medium 150 into which the subsequent encoding process 148 embodies the subsequent encoded message information 162 may be the same as or differ from the medium 130 into which the original encoding process 128 embodies the original encoded message information 142. As described elsewhere herein, the medium 130 and/or 150 may be implemented at any of one or more of the layers of the 7-Layer BRM. For example, the medium 130 and/or medium 150 may be a wire, a network, an email message, a communication protocol (e.g., POP, TCP/IP, HTTP), and/or an application (e.g., an email client, a database application, a web browser, or a web-based application). As some particular examples, the medium 130 and/or medium 150 may be email, encrypted email, or social media messaging (e.g., Facebook posts, Twitter tweets).

For example, if the original medium 130 is a physical object (e.g., flowers), then the message recipient 124 may use the subsequent encoding process 148 to encode information representing that physical object into the second medium 150 in any of a variety of ways. For example, the message recipient 124 may use one or more sensors or a device containing one or more sensors (such as a digital camera or other image capture device) to capture visual, auditory, or other information representing the physical object, in the form of sensor input, and to store data representing and/or derived from such sensor input in the form of electronic data stored in a non-transitory computer-readable medium. As another example, the message recipient 124 may manually input information (such as values of parameters of a model representing the physical object) into a computing device, which may store such information in the form of electronic data in a non-transitory computer-readable medium. The system 200 of FIG. 2 may encode both automatically-captured data (such as an image of the physical object) and manually-entered data (such as parameter values) in the medium 150 to represent the physical object.

The sensors may, for example, receive the sensor input from any one or more of the following: the message creator 122, the message recipient 124, the environment (e.g., air, sound, water, electrical signals, whether or not in contact with or near the message creator 122 or message recipient 124), and computing devices (such as in the form of digital data).

The sensors may include any of the following types of sensors in any combination: location sensors (such as Global Positioning System (GPS) sensors, Bluetooth Low Energy Beacons, or Wi-Fi Positioning System (WPS) sensors); motion sensors; acoustic sensors (such as a geophone, hydrophone, or microphone); chemical sensors (such as breathalyzers, carbon dioxide sensors, and oxygen sensors); electric current, electric potential, magnetic, and radio sensors; flow and fluid velocity sensors; position, angle, displacement, distance, speed, and acceleration sensors; optical, light, imaging, and photon sensors, such as cameras, charge-coupled devices, and CMOS sensors; pressure sensors, such as barographs, barometers, piezometers, pressure gauges, and tactile sensors; force, density, and level sensors, such as piezocapacitive pressure sensors, piezoelectric sensors, strain gauges, and torque sensors; thermal, heat, and temperature sensors, such as calorimeters, infrared thermometers, resistance temperature detectors, resistance thermometers, temperature gauges, thermistors, thermocouples, thermometers, and pyrometers; proximity and presence sensors, such as motion detectors, proximity sensors, passive infrared sensors, touch switches, and wired gloves; and computer input peripherals, such as keyboards, mice, trackpads, trackballs, touchscreens, microphones, and cameras, in which case the sensor input 2606 may be any input capable of being received via such peripherals, such as textual input, position input, motion input, velocity input, pressure input, audio input, visual input, and audiovisual input.

If the sensors receive sensor input from a human (e.g., the message creator 122 or the message recipient 124), the human need not provide the sensor input intentionally. For example, message creator 122 may engage in a motion (such as clapping his hands) without intending to provide such motion as input to the sensors. The sensors may nonetheless receive (sense) the sensor input (e.g., the message creator 122's motion), even though the message creator 122 did not intend to provide such input to the sensors.

The subsequent encoding process 148 may take any of a variety of forms. For example, the subsequent encoding process 148 may use any of a variety of input devices to capture and encode data representing the decoded message information 138 received from the message creator 122, such as a camera, microphone, or scanner. If the message creator 122 transmits the original message 136 in electronic form (such as in the form of an email message), then the subsequent encoding process 148 used by the message recipient 124 may use a computer program to copy and/or derive information from the message creator 122's original message 136 and to store such copied and/or derived information in the modified message 156.

The system 200 of FIG. 2 may provide the message creator 122 with an opportunity to accept or reject the modified message 156 before actually or effectively sending the modified message 156 to the message recipient 124, as illustrated by the "Y/N" decision box 160 in FIG. 2. For example, the system 200 of FIG. 2 may, before actually or effectively sending the modified message 156 to the message recipient 124, provide output to the message creator 122 representing some or all of the modified message 156 and/or notifying the message creator 122 of the modified message 156, in response to which the message creator 122 may provide input to the system 200 of FIG. 2 indicating whether the message creator 122 accepts or rejects the modified message 156. If the input received from the message creator 122 indicates that the message creator accepts the modified message 156, then the system 200 of FIG. 2 may actually or effectively send the modified message 156 to the message recipient 124. If the message creator 122 rejects the modified message 156, the system 200 of FIG. 2 may discard and/or not send or effectively send the modified message 156 to the message recipient 124.

Certain description above and elsewhere herein refers to messages (such as the modified message 156) being "sent or effectively sent" from the message creator 122 to the message recipient 124. A message may be "sent or effectively sent" from the message creator 122 to the message recipient 124 in any of a variety of ways. For example:

- A message may be assigned a message creator identifier associated with the message creator 122. For example, every email message has a "sender" field which has as its value an email address of the sender of the email message. Embodiments of the present invention may assign a message creator identifier associated with the message creator 122 to a message (e.g., the modified message 156), even if that message was not created in response to input from the message creator 122. Performing such an assignment is an example of "effectively sending" the message from the message creator 122, whether or not the message is transmitted (e.g., to the message recipient 124). For example, merely assigning a message creator identifier (e.g., email address) associated with the message creator 122 to a message and storing that message is an example of "effectively sending" the message from the message creator 122, even if the message is not transmitted to any of the message's designated recipients (e.g., the message recipient 124).
- A message may be assigned a message creator identifier associated with the message creator 122, in response to input from the message recipient 124, rather than in response to input from the message creator 122. For example, the message recipient 124 may input the message creator 122's message creator identifier (e.g., email address), in response to which an embodiment of the present invention may assign the message creator 122's message creator identifier to the message. Performing such an assignment and storing the message is an example of "effectively sending" the message from the message creator 122, even if the message is not transmitted, or even if the message is not transmitted to the message recipient 124 who provided the message creator 122's message creator identifier as input.
- In any case in which the message creator 122's message creator identifier is associated with a message without requiring the message creator 122 to provide the message creator identifier as input (as in the example above, in which the message recipient 124 provides the message creator identifier as input), if the message is then transmitted to the message recipient 124, this is an example of sending the message "on behalf of the message creator 122." Note that in such cases, the message bears the message creator identifier of the message creator 122, even though the message creator 122 did not create some or all of the message. As a result, the message may appear, to its message recipient 124, to have been created and/or sent by the message creator 122, even though it was not.

Having described certain embodiments of the present invention in general terms, particular but non-limiting examples of the present invention will now be described.

Consider an example in which the message creator 122 wishes to convey to the message recipient 124 that the message creator 122 loves the message recipient 124. Table 1, below, shows various forms in which a message may be encoded, and various media in which such a message may be encoded by or on behalf of the message creator 122.

TABLE 1

| Encoding Form (as Chosen by Message creator) | Medium (as Chosen by Message creator) | Note: |
|---|---|---|
| Verbal | Spoken Face to Face | |
| Written Letter | Paper delivered by US Postal Service | |
| Written Email | Electronic "file" delivered via email servers and clients | |
| Non-Verbal Physical Object (e.g. a rose) | Rose delivered by courier service | In this example no written note, other than name of message creator 122 and message recipient 124, is included with the rose. The rose itself and the chosen courier service in combination are the encoded message. |

Table 2, below, discloses various ways in which embodiments of the present invention may be used by or on behalf of a message creator 122 to encode message information into an original message in a first medium, and on or behalf of a Message recipient 124 to re-encode the message information from the original message into a modified message in a second medium (wherein the first medium and the second medium may be the same as or different than each other). The examples in Table 2 are merely examples and do not constitute limitations of the present invention.

TABLE 2

| Encoding Form (as Chosen by Message creator) | Medium (as Chosen by Message creator) | Encoding Form (as Chosen by Message recipient) | Example Medium (as chosen by Message recipient) | Process |
|---|---|---|---|---|
| Verbal | Spoken Face to Face | Digital | System of U.S. patent application Ser. No. 14/454,915 | Recipient either makes a recording of the spoken words directly (e.g. creates an mp3 audio file) and/or summarizes them in writing. Audio file and/or written summary is/are uploaded by the Message recipient to the system of U.S. patent application Ser. No. 14/454,915 |

TABLE 2-continued

| Encoding Form (as Chosen by Message creator) | Medium (as Chosen by Message creator) | Encoding Form (as Chosen by Message recipient) | Example Medium (as chosen by Message recipient) | Process |
|---|---|---|---|---|
| | | | | along with identifying information of the Message creator(s) and Message recipient. Message creator is alerted to Message recipient's actions and is given opportunity to Accept, Reject, or Modify the same. |
| Written Letter | Paper delivered by US Postal Service | Digital | System of U.S. patent application Ser. No. 14/454,915 | Recipient either makes a digital copy of the written document directly (e.g. takes a picture or scans document to create a jpg file) and/or summarizes same in writing. Picture file and/or written summary is/are uploaded by the Message recipient to the Invention along with identifying information of the Message creator(s) and Message recipient. Message creator is alerted to Message recipient's actions and is given opportunity to Accept, Reject, or Modify the same. |
| Written Email (or text message, or any other electronic communication (e.g. Facebook wall post) | Electronic "file" delivered via email servers and clients (or other system as appropriate) | Digital | System of U.S. patent application Ser. No. 14/454,915 | Received email is uploaded by the Message recipient to the Invention (e.g. either directly or via cut and paste) along with identifying information of the Message creator(s) and Message recipient. Message creator is alerted to Message recipient's actions and is given opportunity to Accept, Reject, or modify the same |
| Non-Verbal Object (e.g. a rose) | Rose delivered by courier service (e.g. FTD) | Digital | System of U.S. patent application Ser. No. 14/454,915 | Recipient either makes a digital copy of the physical object directly (e.g. takes a picture or scans document to create a jpg file) and/or summarizes same in writing. Picture file and/or written summary is/are uploaded by the Message recipient to the Invention along with identifying information of the Message creator(s) and Message recipient. Message creator is alerted to Message recipient's actions and is given opportunity to Accept, Reject, or Modify the same. |

Certain embodiments of the present invention may be used in conjunction with embodiments disclosed in U.S. patent application Ser. No. 14/454,915, filed on Aug. 8, 2014, entitled, "Computer System and Method for Generating, Exchanging, and Valuing Social Currency," which has been published as U.S. Pat. App. Pub. No. 2015/0057073, and which is hereby incorporated by reference herein. For example, the modified message 156 created by the message recipient 124 in FIG. 2 of the present application may take the form of a "Social Currency Event" (SCE), as that term is used in application Ser. No. 14/454,915. The modified message 156 disclosed herein may, therefore, have any of the features of an SCE as disclosed in application Ser. No. 14/454,915. For example, the modified message 156 may have the following values in reference to FIG. 1 of application Ser. No. 14/454,915:

The "From" field 104*a* of the modified message 156 may include an identifier of the message creator 122, even though the modified message 156 may be created by the message recipient 124. This is because the modified message 156 may be populated with data "as if" it were created by the message creator 122.

The "From Value" field 104*b* of the modified message 156 may include a value of the modified message 156 to the message creator 122. The value of the "From Value" field 104*b* may be populated in any of a variety of ways. For example, when the system 200 of FIG. 2 presents the modified message 156 to the message creator 122, the "From Value" field 104*b* of the modified message 156 may be empty (null), and the system 200 may provide the message creator 122 with an opportunity to input a value to store in the "From Value" field 104*b* of the modified message 156. In this way, the message recipient 124 may create the modified message 156, while the message creator 122 may provide the value of the "From Value" field 104*b* of the modified message 156.

The "To" field 104*c* of the modified message 156 may include an identifier of the message recipient 124, even though the modified message 156 may be created by the message recipient 124. This is because the modified message may be populated with data "as if" it were created by the message creator 122 and sent to the message recipient 124.

The "To Value" field 104*d* of the modified message 156 may include a value of the modified message 156 to the message recipient 124. The value of the "To Value" field 104*d* may be populated in any of a variety of ways. For example, the system 200 of FIG. 2 may provide the message recipient 124 with an opportunity to input a value to store in the "To Value" field 104*d* of the modified message 156 when the message recipient 124 creates the modified message 156, or at a later time.

The "Date Created" field 104*e* of the modified message 156 may be set (e.g., automatically by the system 200 of FIG. 2) to be equal to the "Date Created" field 104*e* (or other similar field containing a creation and/or transmission date) of the original message 136 created by the Message creator 122.

The system 200 of FIG. 2 may automatically populate various other fields of the data structure 102 shown in FIG. 1A of application Ser. No. 14/454,915 in any of a variety of ways, such as by copying values of fields from the original message into the same fields of the modified message, or by deriving values from fields in the original message 136 and storing the derived values in the same or other fields of the modified message 156.

Embodiments of the present invention may interoperate with embodiments of the invention disclosed in application Ser. No. 14/454,915 in any of a variety of ways. For example, consider a case in which the original message 136 is an email message. In this case, the message recipient 124 may create an SCE using an embodiment of the invention disclosed in application Ser. No. 14/454,915. An embodiment of the present invention may then:

Send an email message, effectively from the message creator 122 to the message recipient 124, informing the message recipient of the newly-created SCE. Note that in this case the medium of the original message 136 and the medium of the modified message 156 are both the same, namely email. The modified message 156, however, is an email message which may include information representing attributes which were not represented in the original message 136, such as attributes of the SCE (e.g., a From Value).

Send a message via a software application, such as a mobile application, effectively from the message creator 122 to the message recipient 124, informing the message recipient 124 of the newly-created SCE. Note that in this case the medium of the original message 136 and the medium of the modified message 156 are different; the medium of the original message 136 is email, while the medium of the modified message 156 is a mobile app message. Furthermore, the modified message 156 may include information representing attributes which were not represented in the original message 136, such as attributes of the SCE (e.g., a From Value).

For example, in certain embodiments of the present invention, the message recipient 124 may receive the original message 136 via a first communication protocol, such as an email communication protocol (e.g., in the form of an email message sent or effectively sent by the message creator 122) or a text messaging protocol (e.g., in the form of a text message sent or effectively sent by the message creator 122). The system 200 may then produce the modified message 156 within a software application (e.g., a database application) and without using the first communication protocol, based on the original message 136 and the attribute input 164. For example, the system 200 may produce and store the modified message 156 in the form of a database record or other data structure in the software application without sending a message to the message recipient 124 or the message creator 122. The software application is a different medium than the original medium 130. The software application, therefore, is an example of the subsequent medium 150.

At a subsequent time, the system 200 (e.g., the software application) may transmit a notification message, based on the modified message 156, to the message creator 122 and/or the message recipient 124. The notification message may, for example, contain some or all of the contents of the modified message 156 and/or other information derived from some or all of the modified message 156. The system 200 (e.g., software application) may, for example, transmit the notification message via the same communication protocol via which the original message 136 was transmitted or via a communication protocol that differs from the communication protocol via which the original message 136 was transmitted.

Figure 4:
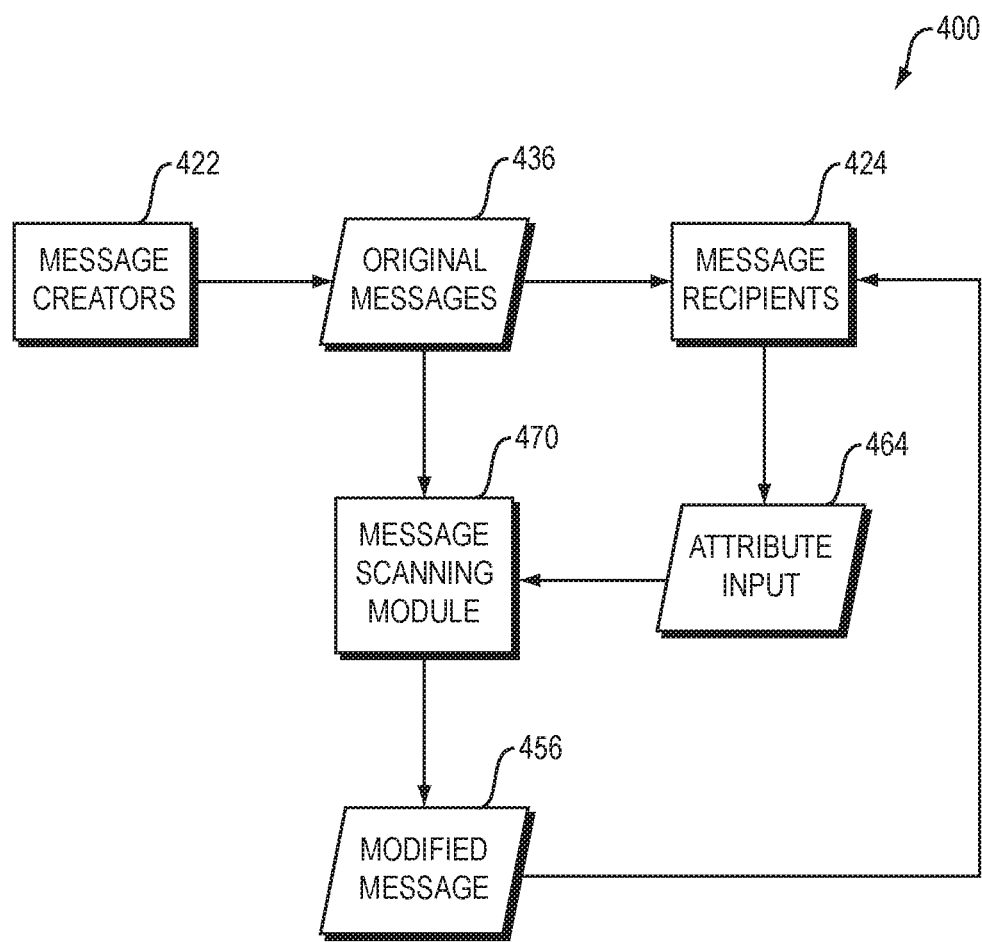
FIG. 4 is a dataflow diagram of a system for automatically and/or semi-automatically adding attributes to messages according to one embodiment of the present invention.
Figure 5:
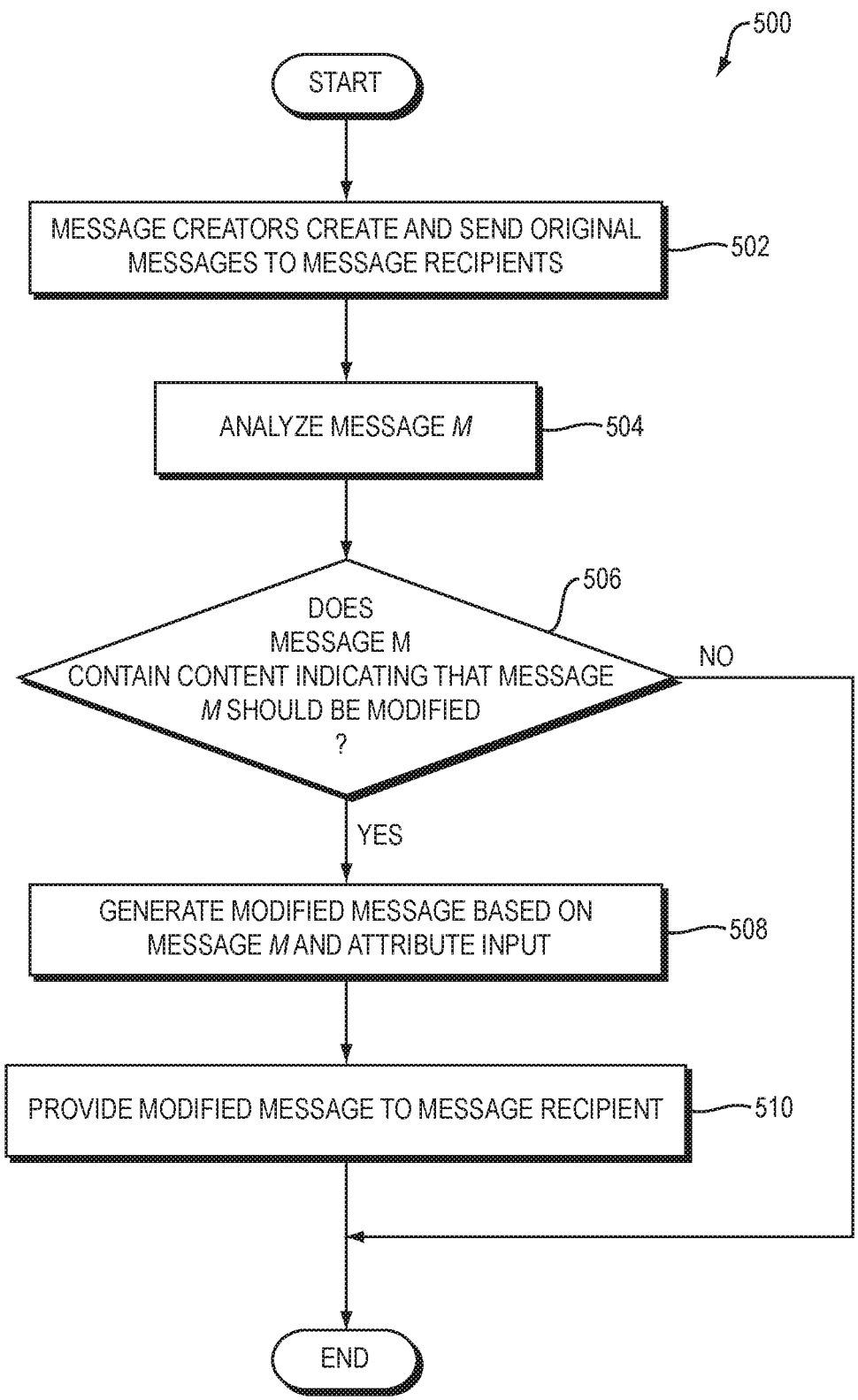
FIG. 5 is a flowchart of a method performed by the system of FIG. 4 according to one embodiment of the present invention.

Embodiments of the present invention may be used to automatically and/or semi-automatically add attributes to messages (e.g., by re-sending the message via different media). For example, referring to FIG. 4, a dataflow diagram is shown of a system 400 for adding attributes to messages according to one embodiment of the present invention. Referring to FIG. 5, a flowchart is shown of a method 500 performed by the system 400 of FIG. 4 according to one embodiment of the present invention.

The system 400 includes one or more message creators 422, who create and send one or more original messages 436 to one or more message recipients 424 (FIG. 5, operation 502). Although FIG. 4 illustrates the creation, transmission, and receipt of the original messages 436 in a simplified form, such creation, transmission, and receipt may be performed in any manner, such as in the manners disclosed above in connection with FIGS. 2 and 3. For example, one or more of the original messages 436 may be created, transmitted, and/or received in any of the ways disclosed herein in connection with the original message 136 and/or the modified message 156.

Although no network is shown in FIG. 4 for ease of illustration, one or more of the original messages 436 may be digital electronic messages that are transmitted over a digital electronic network, such as the Internet. For example, the original messages 436 may include email messages, blog postings, social media postings (e.g., postings on Facebook and/or Twitter), text messages, and instant messages. The original messages 436 may be stored on one or more non-transitory computer-readable media.

Message creators 422 may create and send one or more of the original messages 436 in conventional ways, e.g., without using any of the inventive features disclosed herein. For example, the original messages 436 may include email messages that are created and transmitted by the message creators 422 using conventional email clients in a conventional manner, and which are received by the message recipients 424 using conventional email clients in a conventional manner.

The system 400 also includes a message scanning module 470. The message scanning module 470 may scan (e.g., read some or all of the contents of) one or more of the original messages 436. Such scanning may include scanning messages having different media, e.g., any combination of email messages, blog postings, social media postings, text messages, and instant messages. The message scanning module 470 may, for example, scan all of the original messages 436 on all media within a particular local network.

Neither the message creators 422 nor the message recipients 424 need instruct the message scanning module 470 to scan the original messages 436. Instead, the message scanning module 470 may scan the original messages 436 automatically, e.g., periodically (e.g., once every second, minute, hour, or day) and/or in response to detecting transmission and/or receipt of one or more of the original messages 436.

For ease of illustration, FIG. 5 shows operations that the message scanning module 470 may perform on a single one of the original messages 436, referred to herein as original message M. It should be understood that the message scanning module 470 may repeat the operations in FIG. 5 for some or all of the original messages 436.

The message scanning module 470 may reside in or otherwise be implemented in a computer system that is distinct from the computer systems used by the message creators 422 to send the original messages 436 and by the message recipients 424 to receive the original messages 436. For example, in one embodiment of the present invention, one of the message creators 422 uses a first computing device (e.g., a first smartphone) to create and transmit a particular one of the original messages 436, and one of the message recipients 424 using a second computing device (e.g., a second smartphone) to receive the particular one of the original messages 436. In this case, the message scanning module 470 may, for example, be or include a third computing device (e.g., a server computer) that is distinct from the first and second computing devices. The message scanning module 470 may, for example, scan the original messages 436 while they are in transit from the message creators 422 to the message recipients 424, and/or while the original messages 436 are stored on one or more computer-readable media.

The implementation just described is merely one example and does not constitute a limitation of the present invention. As another example, part or all of the message scanning module 470 may be implemented on one or more computer systems used by one or more of the message creators 422 to create and send one or more of the original messages 436.

As another example, part or all of the message scanning module 470 may be implemented on one or more computer systems used by one or more of the message recipients 424 to receive one or more of the original messages 436.

The message scanning module 470 analyzes message M (FIG. 5, operation 504). Analyzing message M may include analyzing some or all of the message M, such as data representing any one or more of the sender, recipient, subject, or body of message M. The message scanning module 470 automatically determines, based on its analysis of message M, whether message M contains content that indicates or suggests that the recipient of message M, the creator of message, and/or a third party (e.g., an employer) desires that message M be modified (FIG. 5, operation 506). The message scanning module 470 may, for example, determine that message M contains content that indicates or suggests that the recipient of message M, the creator of message M, and/or a third party (e.g., an employer) desires that message M be modified by determining whether the message M contains content indicating or suggestive a positive and/or negative opinion of the message recipient by the message creator.

The message scanning module 470 may use any of a variety of techniques to make the determination in operation 506, such as by applying one or more of the following to message M: natural language processing (NLP), semantic analysis, computer vision, image analysis and processing, and pattern recognition. The message scanning module 470 may, for example, use any such techniques to determine whether message M contains content indicating that message M should be modified. Examples of such techniques are well-known to those having ordinary skill in the art.

If the message scanning module 470 determines that message M contains content indicating that message M should be modified, then the message scanning module 470 generates a modified message 456 based on the original message M and attribute input 464 (FIG. 5, operation 508). The message scanning module 470 may, for example, generate the modified message 456 in any of the ways disclosed herein for generating the modified message 156 in FIG. 2. For example, generating the modified message 456 may include storing and/or transmitting the modified message 456 on a different medium than the original message M.

As merely one example, if the message creator sends message M to the message recipient via a first communication protocol, such as an email communication protocol (e.g., in the form of an email message sent or effectively sent by the message creator) or a text messaging protocol (e.g., in the form of a text message sent or effectively sent by the message creator), then the message scanning module 470 may produce the modified message 456 within a software application (e.g., a database application) and without using the first communication protocol, based on the original message M and the attribute input 464. For example, the message scanning module 470 may produce and store the modified message 456 in the form of a database record or other data structure in the software application without sending a message to the message recipient or the message creator. The software application is a different medium than the original medium of message M. The software application, therefore, is an example of the subsequent medium of the modified message 456.

The message scanning module 470 may, for example, receive the attribute input 464 from the recipient of message M. This, however, is merely an example and is not a requirement of the present invention. Alternatively, for example, the message scanning module 470 may generate the attribute input 464 automatically, e.g., without receiving any input from the creator and/or recipient of message M. For example, the message scanning module 470 may be configured to add one or more particular attributes to the message M (e.g., to change the medium of the message M to a particular other medium) automatically. As a particular example, the message scanning module 470 may apply one or more rules to the message M, where each rule specifies a condition and a corresponding action. If the message scanning module 470 determines that the message M satisfies the condition of one of the rules, then the message scanning module 470 may, in response, perform the corresponding action specified by the rule, where the action may include adding one or more specified attributes to the message M (e.g., changing the medium of the message M to a medium specified by the rule). The message scanning module 470 may, for example, apply machine learning to generate and apply new rules to subsequent messages based on the attribute input 464 that was applied to previous messages.

The message scanning module 470 provides the modified message 456 to the recipient of message M (FIG. 5, operation 510). For example, the message scanning module 470 may provide the modified message 456 to the message recipient in any of the ways disclosed herein for providing the modified message 156 of FIG. 2 to the message recipient 124. The message scanning module 470 may thereby send or effectively send the modified message 456 to the recipient of message M.

The message scanning module 470 may, for example, generate the modified message 456 automatically, e.g., without input from the creator of message M (other than the input required to create and send message M) and without input from the recipient of message M (other than the input required to create and send message M). As another example, the message scanning module 470 may only generate and/or provide the modified message 456 to the recipient of message M if, and in response to, input confirming that the modified message 456 should be provided to the recipient of message M. Such input may, for example, be received by the message scanning module 470 from the creator of message M and/or the recipient of message M.

For example, the message scanning module 470 may, in response to determining that message M contains content indicating that message M should be modified (FIG. 5, operation 506), provide a prompt to the creator of message M. The message creator may provide input in response to such a prompt, indicating whether the modified message 456 should be generated. If the input from the message creator indicates that the modified message 456 should be provided to the recipient, then the message scanning module 470 may generate and provide the modified message 456 to the recipient.

As a similar example, the message scanning module 470 may, in response to determining that message M contains content indicating that message M should be modified (FIG. 5, operation 506), provide a prompt to the recipient of message M. The message recipient may provide input in response to such a prompt, indicating whether the modified message 456 should be generated. If the input from the message recipient indicates that the modified message 456 should be provided to the recipient, then the message scanning module 470 may generate and provide the modified message 456 to the recipient.

As yet another example, the message scanning module 470 may generate a confidence measure indicating a degree of confidence that the message M contains content indicating that message M should be modified. If the confidence measure exceeds a particular confidence threshold (e.g., 50%, 60%, 70%, 80%, or 90%), then the message scanning module 470 may generate the modified message 456 and provide the modified message 456 to the recipient of message M without requiring confirmation from the creator or recipient of message M. If the confidence measure does not exceed the confidence threshold, then the messages scanning module 470 may either not generate and provide the modified message 456 to the recipient of message M, or generate and provide the modified message 456 to the recipient of message M only in response to receiving confirmatory input from the creator and/or recipient of message M, as described above.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

The term "computing device" refers herein to any device that includes a processor and a computer-readable memory capable of storing computer-readable instructions, and in which the processor is capable of executing the computer-readable instructions in the memory. The terms "computer system" and "computing system" refer herein to a system containing one or more computing devices.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may operate on digital electronic messages which can only be created, stored, modified, processed, and transmitted by computing devices and other electronic devices. Such embodiments, therefore, address problems which are inherently computer-related and solve such problems using computer technology in ways which could not be solved manually or mentally by humans.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to use a computer system to create a modified version of a digital electronic message that includes attributes not included by the original creator of the digital electronic message, and to send the modified version to the message's recipient via a digital electronic network. There is no analog to this problem in the non-computer environment, nor is there an analog to the solutions disclosed herein in the non-computer environment. For example, non-computerized messages are merely sent by message creators to message recipients, such as when a hand written postcard is sent from a parent to a child. If the child were to add information to that postcard, such as by writing additional text on it, and then re-send the postcard to the child's parent, the re-sent postcard would be sent from the child to the parent. In contrast, in embodiments of the present invention, the re-sent (modified) message is effectively sent from the message creator to the message recipient, even if it is the message recipient who creates the modified message. There are no known mechanisms for achieving this effect in the world of non-computerized messages (e.g., for the child to re-send the parent's postcard to himself as if it had been sent to him from his parent), and therefore embodiments of the present invention are directed to problems that are inherently rooted in computer technology.

Furthermore, embodiments of the present invention represent improvements to computer and communication technology itself. For example, the system 200 of FIG. 2 is an improved computer system, which may, for example, be implemented within a single computing device. Such a computer system (e.g., computing device) is an improved computer system because, for example, it provides the ability to enable a message recipient to add attributes to a received digital electronic message, and to effectively re-send the message as if it had been sent from the message creator to the message recipient. Such a computer system is an improved computer system because it provides all of the benefits disclosed herein, which are not provided by prior art systems.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on at least one non-transitory computer-readable medium, the method comprising:
   (A) receiving, via a first medium, an original message created by a message creator, wherein the message encodes first message information and message recipient data representing an identity of the message recipient, wherein receiving the original message comprises receiving the original message over a network via a first communication protocol;
   (B) receiving attribute input from the message recipient;
   (C) producing a modified message, within a software application and without using the first communication protocol, based on the original message and the attribute input;
   (D) prompting the message creator to accept or reject the modified message; and
   (E) receiving input from the message creator indicating one of acceptance and rejection of the modified message.

2. The method of claim 1, wherein (C) comprises modifying the original message, based on the attribute input, to produce the modified message.

3. The method of claim 2, wherein (C) comprises adding an attribute having a value to the original message, based on the attribute input, to produce the modified message.

4. The method of claim 1, wherein (C) comprises generating the modified message based on the first message information, the message recipient data, and the attribute input.

5. The method of claim 4, wherein (C) comprises generating the modified message to include the first message information, the message recipient data, and information derived from the attribute input.

6. The method of claim 1, wherein (C) comprises:
   (C)(1) generating additional information based on the attribute input; and
   (C)(2) adding the additional information to the original message to produce the modified message.

7. The method of claim 1, further comprising:
   (D) transmitting the modified message to the message recipient.

8. The method of claim 7, wherein (D) comprises transmitting the modified message from the message creator to the message recipient.

9. The method of claim 1, wherein (A) comprises receiving the original message from the message creator.

10. The method of claim 1, wherein (A) comprises receiving the original message via a first medium, and wherein the method further comprises:
    (D) transmitting the modified message via a second medium, wherein the first medium differs from the second medium.

11. The method of claim 10, wherein the attribute input specifies the second medium, and wherein the method further comprises:
    (E) before (D), identifying the second medium based on the attribute input.

12. The method of claim 1, further comprising:
    (D) notifying the message creator that the modified message has been produced.

13. The method of claim 12, wherein (D) comprises transmitting the modified message to the message creator.

14. The method of claim 1, wherein the attribute input specifies an identity of the message creator, and wherein (C) comprises producing the modified message to include data representing the identity of the message creator.

15. The method of claim 1, wherein the attribute input specifies an identity of the message recipient, and wherein (C) comprises producing the modified message to include data representing the identity of the message recipient.

16. The method of claim 1, wherein the attribute input specifies a time at which the original message was created, and wherein (C) comprises producing the modified message to include data representing the time at which the original message was created.

17. The method of claim 1, wherein the attribute input specifies a place at which the original message was created, and wherein (C) comprises producing the modified message to include data representing the place at which the original message was created.

18. The method of claim 1, wherein the attribute input includes data representing a physical object, and wherein (C) comprises producing the modified message to include the data representing the physical object.

19. A computer system comprising at least one non-transitory computer-readable medium having stored thereon computer program instructions executable by at least one computer processor to perform a method, the method comprising:
   (A) receiving, via a first medium, an original message created by a message creator, wherein the message encodes first message information and message recipient data representing an identity of the message recipient, wherein receiving the original message comprises receiving the original message over a network via a first communication protocol;
   (B) receiving attribute input from the message recipient;
   (C) producing a modified message, within a software application and without using the first communication protocol, based on the original message and the attribute input;
   (D) prompting the message creator to accept or reject the modified message; and
   (E) receiving input from the message creator indicating one of acceptance and rejection of the modified message.

* * * * *